US011280291B2

(12) United States Patent
Chen et al.

(10) Patent No.: US 11,280,291 B2
(45) Date of Patent: Mar. 22, 2022

(54) CYLINDER LINER WITH TEMPERATURE SENSOR

(71) Applicant: MAHLE International GmbH, Stuttgart (DE)

(72) Inventors: Yu Chen, Novi, MI (US); Russ Wilkinson, New Hudson, MI (US); Dave Kent, Highland, MI (US)

(73) Assignee: MAHLE International GmbH, Stuttgart (DE)

( * ) Notice: Subject to any disclaimer, the term of this patent is extended or adjusted under 35 U.S.C. 154(b) by 143 days.

(21) Appl. No.: 16/731,225

(22) Filed: Dec. 31, 2019

(65) Prior Publication Data
US 2021/0199068 A1 Jul. 1, 2021

(51) Int. Cl.
| | |
|---|---|
| *G01M 15/08* | (2006.01) |
| *F02F 1/00* | (2006.01) |
| *F02D 35/02* | (2006.01) |
| *G01M 15/04* | (2006.01) |
| *B23H 9/00* | (2006.01) |

(Continued)

(52) U.S. Cl.
CPC .............. *F02F 1/004* (2013.01); *B23H 9/00* (2013.01); *F02D 35/025* (2013.01); *G01L 1/2206* (2013.01); *G01M 15/048* (2013.01); *F02F 2001/008* (2013.01); *G01K 2205/00* (2013.01); *H04W 4/38* (2018.02); *H04W 4/40* (2018.02)

(58) Field of Classification Search
CPC ...... F02F 1/004; G01M 15/048; G01M 15/08; G01M 15/11; G01M 15/12; G01K 2205/00; H04W 4/38; H04W 4/40
See application file for complete search history.

(56) References Cited

U.S. PATENT DOCUMENTS

| | | | | |
|---|---|---|---|---|
| 4,397,176 | A | * | 8/1983 | Rohde ...................... G01K 1/14 374/144 |
| 4,662,321 | A | * | 5/1987 | Devaux ..................... F01P 3/02 123/193.2 |

(Continued)

FOREIGN PATENT DOCUMENTS

| | | |
|---|---|---|
| CN | 102175166 A | 9/2011 |
| CN | 203298717 U | 11/2013 |

(Continued)

OTHER PUBLICATIONS

Wärtsilä, "Wärtsilä Cylinder liner temperature monitoring system," 2017 Wärtsilä Corporation, total of 2 pages.

*Primary Examiner* — Eric S. McCall
(74) *Attorney, Agent, or Firm* — Collard & Roe, P.C.

(57) ABSTRACT

A cylinder liner for an internal combustion engine is formed of cylindrical liner body having an interior cavity with a cylindrical inner surface, a sensor embedded in the cylindrical liner body and being configured for sensing a physical condition on the cylindrical inner surface, and a transmitter connected to the cylindrical liner body at a position remote from the sensor. A connecting wire connects the transmitter to the sensor, and is embedded in in the cylindrical liner body. The sensor is located in an upper portion of the cylindrical liner body and the transmitter is located directly below the sensor, such that the wire runs vertically. The transmitter can send information obtained by the sensor to a remote processor for calculating various operating states of the liner.

13 Claims, 4 Drawing Sheets

(51) Int. Cl.
*G01L 1/22* (2006.01)
*H04W 4/38* (2018.01)
*H04W 4/40* (2018.01)

(56) References Cited

U.S. PATENT DOCUMENTS

| | | |
|---|---|---|
| 5,553,585 A | 9/1996 | Paro |
| 6,131,465 A | 10/2000 | Wlodarczyk et al. |
| 6,367,463 B1 | 4/2002 | Nurmi |
| 6,516,774 B2 | 2/2003 | Zur Loye et al. |
| 8,429,958 B2 | 4/2013 | Saito et al. |
| 8,851,042 B2 | 10/2014 | Imhasly |
| 9,957,887 B2 | 5/2018 | Roe et al. |
| 9,958,358 B2 | 5/2018 | Roe et al. |
| 10,060,828 B2 | 8/2018 | Roe et al. |
| 10,161,308 B2 | 12/2018 | Roe et al. |
| 2009/0080492 A1* | 3/2009 | Takeuchi ............. G01K 1/14 374/144 |
| 2014/0245821 A1* | 9/2014 | Miller ............ G01M 15/04 73/114.01 |
| 2015/0219040 A1* | 8/2015 | Kasic .............. F02B 77/085 123/193.5 |
| 2015/0314963 A1* | 11/2015 | Chu ............... B65G 19/08 198/731 |
| 2018/0030914 A1* | 2/2018 | Roe ................ F02D 35/023 |
| 2018/0067003 A1 | 3/2018 | Michiwaki |
| 2019/0383319 A1* | 12/2019 | Simpson ............. C09D 5/32 |
| 2021/0293986 A1* | 9/2021 | MacVittie ........... E01C 23/163 |
| 2021/0339309 A1* | 11/2021 | Bremner ............. B22C 9/10 |

FOREIGN PATENT DOCUMENTS

| | | |
|---|---|---|
| CN | 102507728 B | 10/2014 |
| CN | 105673179 A | 6/2016 |
| EP | 1 006 271 A2 | 6/2000 |
| EP | 1 369 572 A2 | 12/2003 |
| FR | 2 886 344 A1 | 12/2006 |
| JP | 2502207 Y2 | 6/1996 |
| JP | 2009-270873 A | 11/2009 |
| WO | 2009/127232 A1 | 10/2009 |
| WO | 2009/127234 A1 | 10/2009 |
| WO | 2017/149190 A1 | 9/2017 |

\* cited by examiner

CYLINDER LINER WITH TEMPERATURE SENSOR

BACKGROUND OF THE INVENTION

1. Field of the Invention

This invention relates to a cylinder liner having an integrated sensor that is equipped to sense a property such as temperature of the interior face of the liner and optionally send an alarm signal if the property exceeds a preset limit.

2. The Prior Art

Cylinder liners in internal combustion engines are subject to large degrees of stress and temperature fluctuations, due to the motion of the pistons and the combustion taking place inside them. Efforts to monitor the liner surface have been made, such as in U.S. Pat. No. 6,131,465, which discloses spark plugs having pressure sensors to monitor excess pressure on the cylinder surface. Another monitoring system is disclosed in European Patent No. EP 1 006 271 B1, which uses ultrasonic transducers mounted on the collar of the cylinder liner to monitor the wear on the cylinder liner. The transducers are connected to one another and are wired to a controller. While these systems are capable of monitoring some properties of the cylinder liner, it would be beneficial to be able to monitor properties within the liner including temperature without the need for wires extending externally from the cylinder liner, as the wires can become corroded and subject to breakage and have durability issues within the engine environment.

SUMMARY OF THE INVENTION

It is therefore an object of the invention to provide a cylinder liner having embedded sensors that can transmit data to a remote location without the need for external wiring.

This object is accomplished by a cylinder liner for an internal combustion engine comprising a cylindrical liner body having an interior cavity with a cylindrical inner surface, at least one sensor embedded in the liner body and a wireless transmitter connected to the sensor. This connection can take place via running a wire connection through the cylinder liner body to the location of the transmitter, which can be disposed remote from the sensor, i.e., in a location of the liner that is not subject to the same stresses and heat fluctuations as the location of the sensor.

The sensor can be any suitable type of sensor, depending on the property being measured. In one embodiment, the sensor is a temperature sensor in the form of a thermocouple. Alternatively, the sensor could measure pressure on the surface of the cylinder liner. The sensor could also be a strain sensor, which can be printed on the outer diameter of the cylinder liner. The sensor could also be positioned to determine the temperature or other properties of other components, such as the piston rings or piston body.

It is preferable if the wire connecting the sensor to the transmitter is placed inside the cylinder body and runs longitudinally down a channel in the cylinder body to the location of the wireless transmitter. This can be accomplished after casting of the cylinder body by machining a longitudinal groove down the length of the body, placing the wire in connection with the sensor, and then filling in the gap in the cylinder body with thermal spray or epoxy. Alternatively, a bore can be cut into the liner wall via wire electrical discharge machining (EDM), so that no filler is needed. Other methods could also be used.

The transmitter can be powered by a high temperature battery. The transmitter could be either a BLUETOOTH® or a wireless internet (WiFi) transmitter. The transmitter can be located on the inner surface of the liner, at a location outside the path of the piston.

The sensor can be embedded in the material of the cylinder liner so that the sensor is located as close as possible to the interior face of the cylinder without interfering in the inner surface, which is in contact with the piston during operation. The sensor could be placed at the same time as the wire, or the wire could be connected separately, depending on the machining method used and the location of the sensor. In the embodiment using a strain sensor that is printed on the outer diameter of the liner, the wire can be placed in a machined groove of the liner to be connected to the transmitter at a remote location.

The data from the sensor that is transmitted wirelessly can be sent to a processor that can convert the data into readable form on a display for use by the operator. The processor can be programmed to send an alarm signal if the data from the sensor exceeds a pre-programmed limit, for example temperature, pressure or strain values that exceed a normal value during operation of the engine.

The advantages to the sensor system according to the invention are the ability to shut down the engine prior to failure, and the ability to do preventative maintenance if the system is sensing increased temperatures, pressure, strain, etc. In addition, the information provided during engine operation can be used to adjust the piston performance for increased fuel efficiency. The temperature information can also be used to assess bore distortion in the liner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
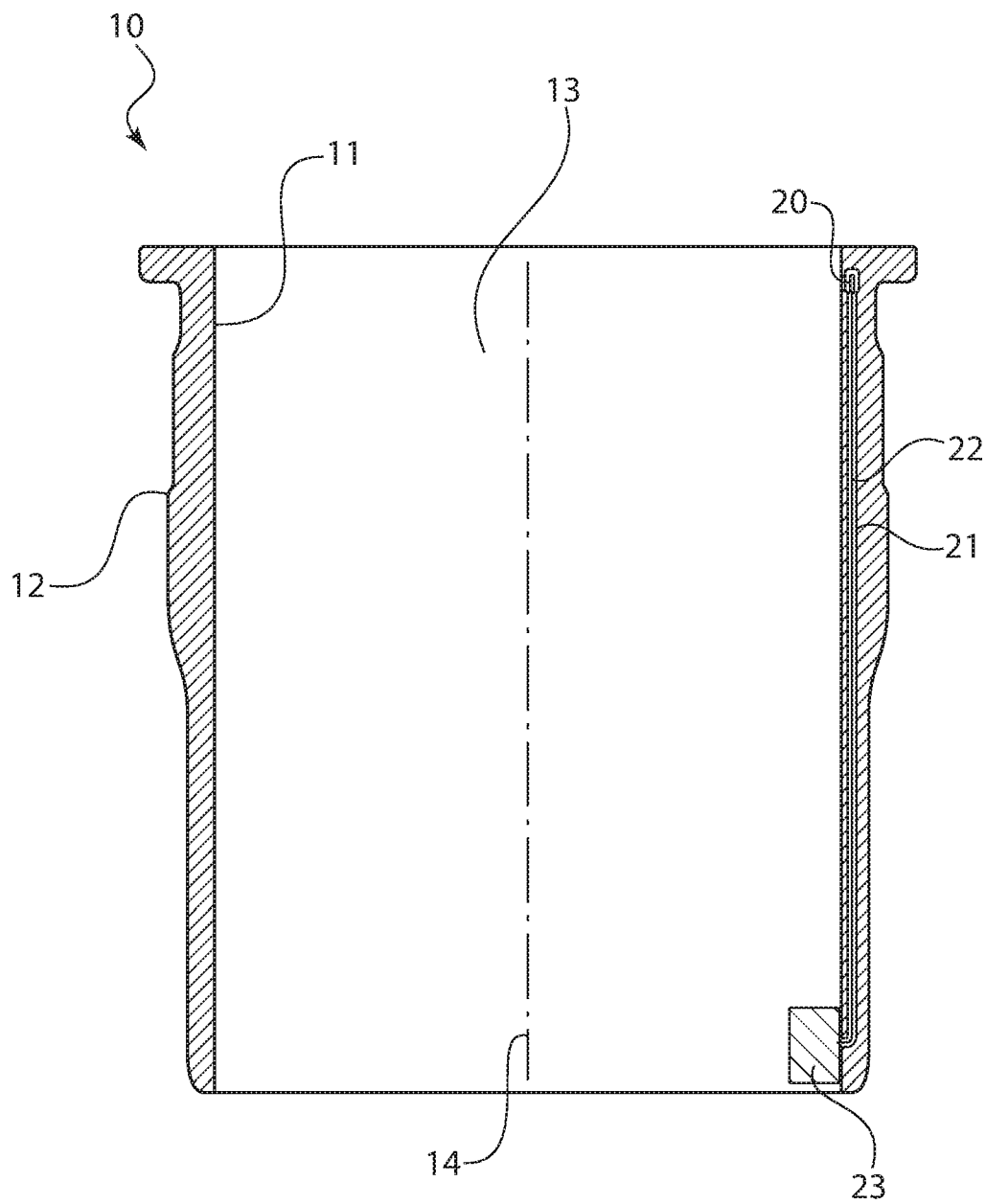
FIG. 1 shows a cross-section of a cylinder liner according to the invention.

Referring now in detail to the drawings and, in particular, FIG. 1 shows a first embodiment of the cylinder liner 10 according to the invention. Cylinder liner 10 has a cylindrical inner surface 11, an outer surface 12, and a cavity 13, for accommodating a piston. A cylinder axis 14 extends parallel to the inner and outer surfaces 11, 12. A channel 21 is formed in the wall of liner 10 preferably by EDM, and a sensor 20 along with a wire 22 is placed in channel 21. Sensor 20 is preferably disposed as close as possible to the inner wall 11 of liner 10, so that it can sense temperature or other properties of the inner wall 11 during engine operation. At the other end of wire 22 is a transmitter 23, which is placed on inner wall 11 of liner 20, below the location of the piston in operation. Sensor 20 can be a thermocouple for temperature sensing, or can be any other suitable type of sensor for measuring the desired variable of the combustion chamber via embedding, printing or placing the sensor within the liner wall or exterior surface of the liner. Transmitter 23 can be a Wifi or BLUETOOTH® transmitter. It can be powered by a high-temperature battery that is disposed within the housing of transmitter 23. In addition the power source may include various power generations, for example utilizing the temperature difference between the inner combustion chamber and the exterior cooling. The power generation may also convert the mechanical movement via magnetics, field changes or other movement around the liner to power the sensors and transmission.

Figure 2:
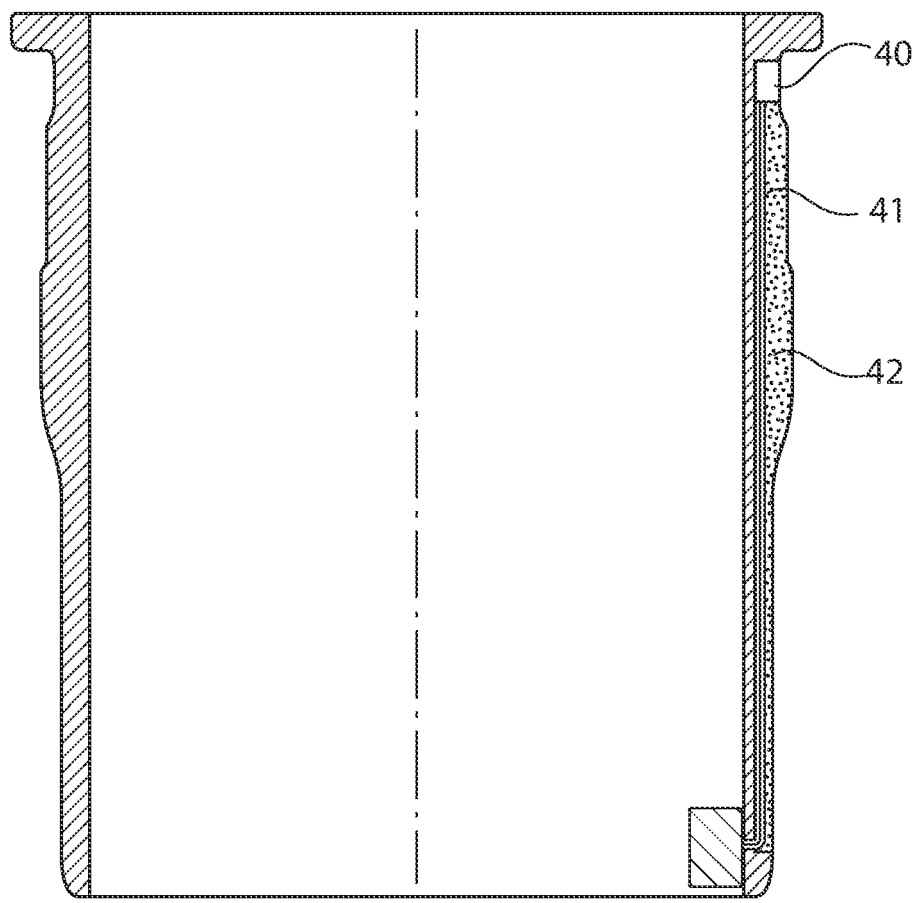
FIG. 2 shows a cross-section of an alternative embodiment of the cylinder liner.

Alternatively, as shown in FIG. 2, sensor 40 which may include for example a strain sensor, or temperature sensor that is printed or deposited by additive manufacturing or coating on the outside surface 12 of cylinder liner 10. Wire 12 is then placed in a groove 41 that is cut into outer surface 12 of cylinder liner 10, connecting the sensor 40 to a transmitter 23. Once the wire 12 is placed within the groove 41, the groove 41 is then filled with a filler 42 such as iron powder via a suitable process such as thermal spraying, or alternatively may utilize various materials that can withstand the combustion environment such as some epoxies. Optionally, the outer surface 12 may be further machined or finished to allow the filled groove 41 to maintain the same exterior dimensions, therefore allowing the liner 10 to be fitted into a standard engine block (not shown). Wire 12 is connected to transmitter 23 in the same manner as described above with respect to FIG. 1. The sensor 40 may measure various real-time conditions in the engine component or liner 10 that may be useful for determining an issue or property within the combustion chamber that may affect the durability of the liner 10, piston rings, or piston or efficiency of the engine and the combustion with the liner 10. The sensors 40 may be calibrated and use various sensors on the same liner 10 to determine events such as scuffing, overheating, combustion pressures, and forces. For example, the liner may have multiple sensors 40 axially spaced along the liner 10. In other options, the sensors 40 may be radially spaced around the liner 10. The spacing and placement of the sensors 40 may further be optimized to measure a specific characteristic or variables for correlating to other engine components. For example the real time temperature fluctuations may allow for a predictions of ring positioning to identify issues such as alignment of the ring gaps, or piston body temperature. In addition, the sensor arrangement may vary to allow for the system to be optimized for various engine controls, failure moods, and the real time measuring and wireless transmission allows for real-time measurements.

Figure 3:
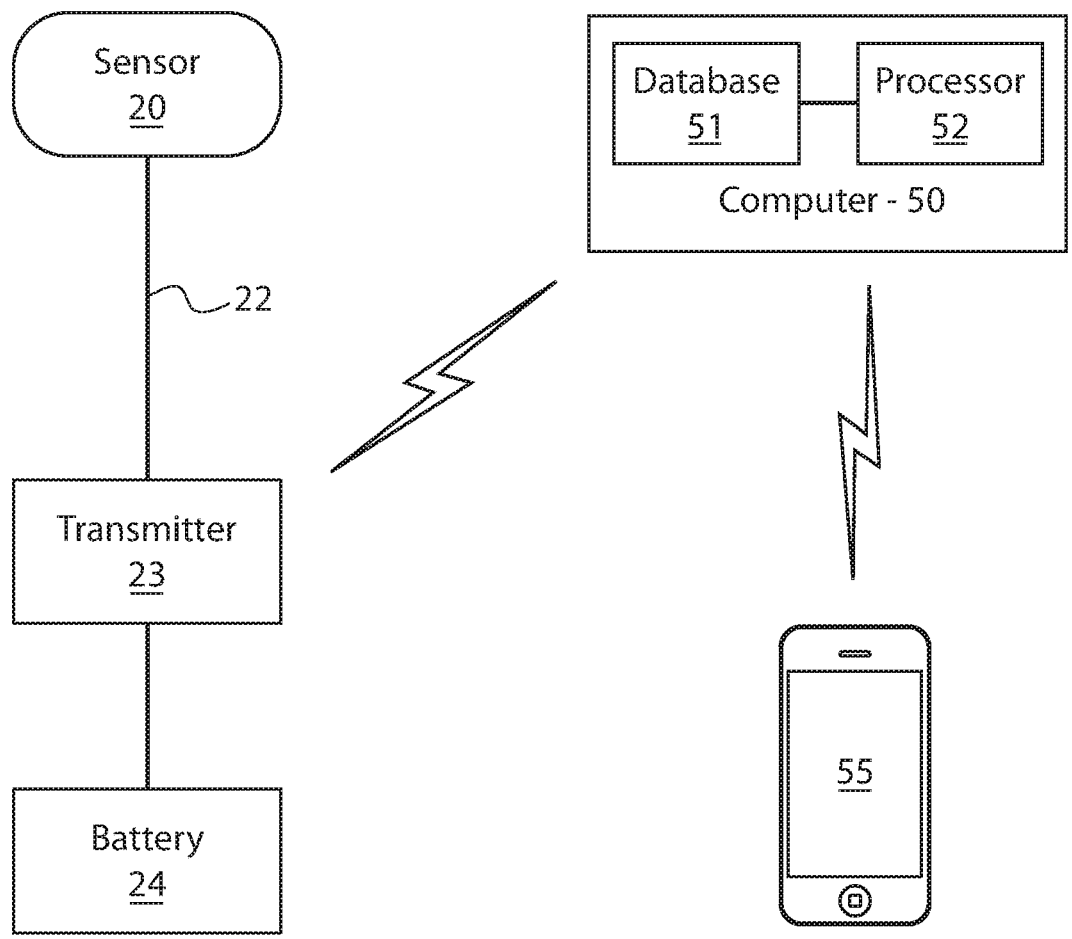
FIG. 3 shows a block diagram of the system according to the invention.

The components of the liner system are shown in FIG. 3 in a block diagram. As shown, data from sensor 20 is transmitted through wire 22 to transmitter 23, which is powered by a battery 24. Transmitter 23 then sends this data to a remote computer 50, which stores it in a database 51 and compares the data via a processor 52 to previously stored data. If the data from transmitter 23 exceeds a predetermined limit, processor 52 sends an alarm signal. This signal could be an audible alert or a visual display. The signal could also be transmitted to a remote location, such as an operator's mobile telephone 55, via any suitable method. The alarm could be a voice call, an SMS message, an email or a push notification, or any other suitable alert, or fleet management.

Alternatively, the computer 50 may further communicate with the engine controller (not shown) to allow for the controller to change fuel, air, and output to correct the noted issues, or to optimize the engine combustion with the real-time data from the sensor.

Figure 4:
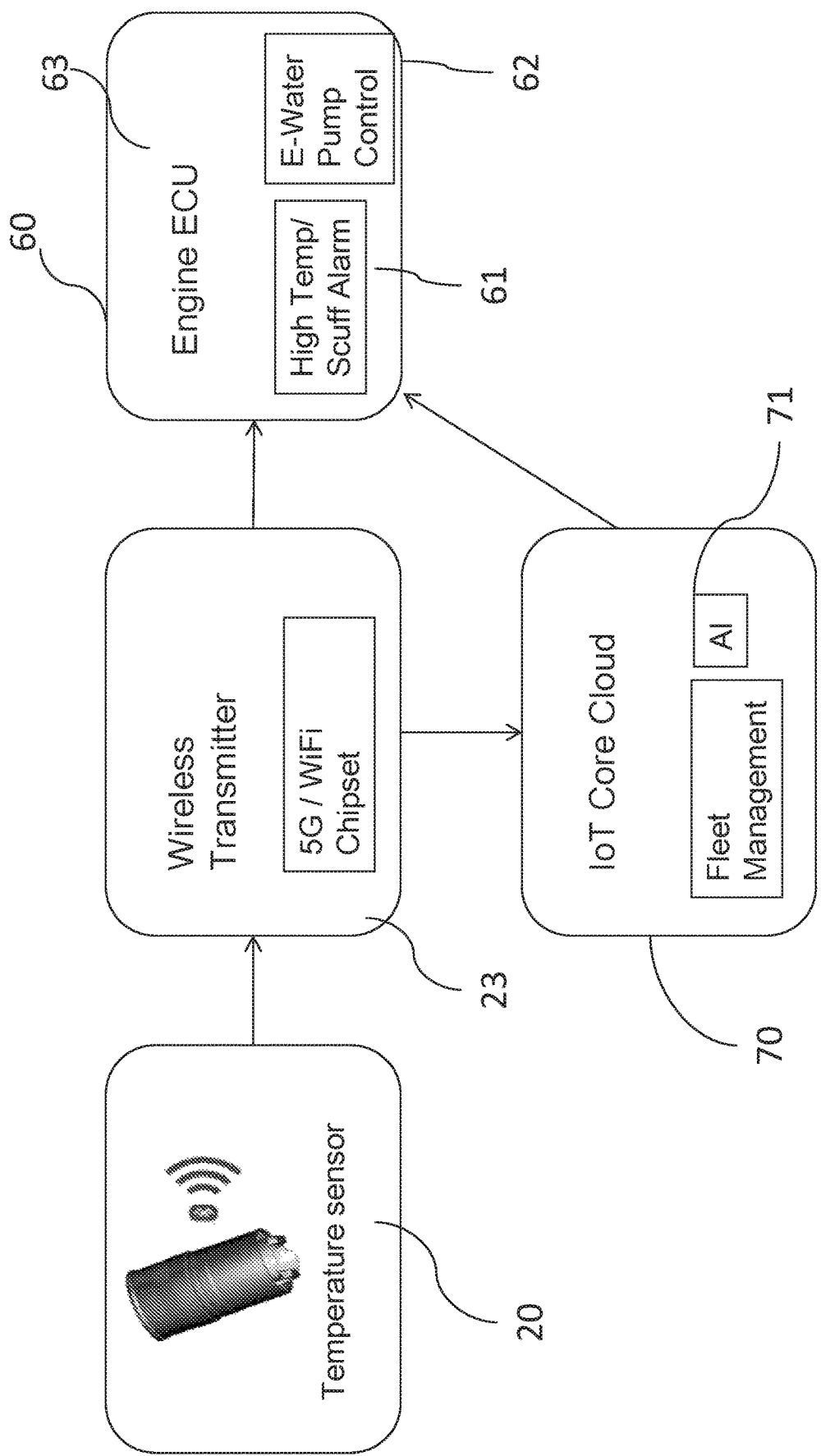
FIG. 4 shows a block diagram of an alternative embodiment of the system according to the invention.

FIG. 4 illustrates an additional embodiment for the system that may allow for cloud based computing and collection of data that may be transmitted by transmitter 23 to an engine control unit (ECU) 63 to further optimize the engine 60 with real time data for real-time combustion and optimization, such as a high temperature/scuff alarm 61 or a water pump control 62. In addition, the data may be used for engine mapping, performance enhancements and failure or maintenance alerts. FIG. 4 illustrates additional system aspects that include various communication pathways contemplated with the Bluetooth liner 10. The liner 10 in this example includes a temperature sensor 20, but various sensor data may be captured and transmitted by the various methods. The transmitter could also send the sensor data to a cloud-based server system 70, in order to control the engine 60, instead of direct communication between the transmitter 23 and the engine controller (ECU) 63. Alternatively, the cloud based system 70 could coordinate with artificial intelligence 71 to control fleet management.

The present invention provides a novel way to monitor properties of a cylinder liner during operation of a combustion engine, and to prevent damage to the liner and/or other components by alerting the operators of unusual levels of temperature, pressure or strain on the system. In addition, the liner and embedded sensor may further allow for additional calibration mapping to allow the computer 50, to adjust operational aspects of the engine. The adjustments could be to optimize the engine output for various environments such as high altitudes, or reducing the engine output if for example a temperature spike would indicate a scuffing event or various possible failures within the combustion chamber.

Accordingly, while only a few embodiments of the present invention have been shown and described, it is obvious that many changes and modifications may be made thereunto without departing from the spirit and scope of the invention.

What is claimed is:

1. A cylinder liner for an internal combustion engine comprising:
   a cylindrical liner body having an interior cavity with a cylindrical inner surface;
   a sensor located in or on the cylindrical liner body and being configured for sensing a physical condition of the liner;
   a transmitter disposed on the cylindrical liner body at a position remote from the sensor; and
   a connecting wire connecting the transmitter to the sensor, the connecting wire being embedded in in the cylindrical liner body.

2. The cylinder liner according to claim 1, wherein the sensor is located in an upper portion of the cylindrical liner body and the transmitter is located directly below the sensor, such that the wire runs vertically.

3. The cylinder liner according to claim 1, wherein the sensor is a temperature sensor and is embedded in the liner body.

4. The cylinder liner according to claim 3, wherein the temperature sensor is a thermocouple.

5. The cylinder liner according to claim 1, wherein the transmitter is a Wifi or BLUETOOTH® transmitter.

6. The cylinder liner according to claim 1, wherein the sensor is a strain sensor.

7. The cylinder liner according to claim 6, wherein the strain sensor is printed on an outer surface of the liner body.

8. The cylinder liner according to claim 1, wherein the sensor and wire are positioned in a channel formed in the liner body.

9. A method for manufacturing a cylinder liner for an internal combustion engine, comprising:
   forming a cylindrical liner body having an internal cavity with a cylindrical inner surface;
   machining a channel in the cylindrical liner body,
   placing a sensor in one end of the channel and a wire connected to the sensor through a longitudinal extent of the channel to another end of the channel;
   connecting the wire to a wireless transmitter; and
   connecting the transmitter to the cylindrical liner body.

10. The method according to claim 9, wherein the step of machining a channel includes cutting a groove in the liner body from an outside diameter of the liner body, and then filling the groove with thermal spray of iron powder after placement of the sensor and wire.

11. The method according to claim 9, wherein the channel runs vertically, parallel to a cylindrical axis of the cylinder liner.

12. The method according to claim 9, wherein the channel is cut using electrical discharge machining.

13. A method for manufacturing a cylinder liner for an internal combustion engine, comprising:
   forming a cylindrical liner body having an internal cavity with a cylindrical interior surface;
   printing a sensor on an exterior surface of the liner body;
   machining a groove in an exterior surface of the cylindrical liner body,
   placing a wire connected to the sensor through a longitudinal extent of the groove to another end of the channel;
   connecting the wire to a wireless transmitter;
   connecting the transmitter to the cylindrical liner body; and
   filling the groove.

* * * * *